() United States Patent (10) Patent No.: US 7,490,594 B2
Van Dyne et al. (45) Date of Patent: Feb. 17, 2009

(54) SUPER-TURBOCHARGER

(75) Inventors: Ed Van Dyne, Loveland, CO (US);
Thomas A. Gendron, Fort Collins, CO (US)

(73) Assignee: Woodward Governor Company, Fort Collins, CO (US)

( * ) Notice: Subject to any disclaimer, the term of this patent is extended or adjusted under 35 U.S.C. 154(b) by 46 days.

(21) Appl. No.: 11/204,817

(22) Filed: Aug. 16, 2005

(65) Prior Publication Data

US 2006/0032225 A1 Feb. 16, 2006

Related U.S. Application Data

(60) Provisional application No. 60/601,844, filed on Aug. 16, 2004.

(51) Int. Cl.
*F02B 33/00* (2006.01)
*F02B 33/44* (2006.01)
*F16H 37/00* (2006.01)
*F16H 3/44* (2006.01)
*F16H 55/17* (2006.01)
*F16H 3/72* (2006.01)
*F16H 47/04* (2006.01)
*F16H 47/08* (2006.01)
*F16H 37/02* (2006.01)

(52) U.S. Cl. ............ 123/561; 123/559.3; 123/559.1; 60/608; 475/297; 475/76; 475/8; 475/2; 475/104; 74/438; 417/423.6

(58) Field of Classification Search ........... 60/606–609, 60/611, 624; 123/559.1, 561, 559.3; 417/53, 417/423.6, 236; 475/80, 76, 8, 211, 297, 475/104; 75/15.86, 438
See application file for complete search history.

(56) References Cited

U.S. PATENT DOCUMENTS 2,390,487 A * 12/1945 Lawrence et al. ........... 475/104

(Continued)

FOREIGN PATENT DOCUMENTS

EP 517675 A1 * 12/1992

(Continued)

OTHER PUBLICATIONS

Ulrich Hopmann Caterpillar Inc., Caterpillar Engine Research Diesel & Emissions Technology, Diesel Engine Waste Heat Recovery Utilizing Electric Turbocompound Technology, 2002 DEER Conference Aug. 25-29, 2002 Overhead Presentation, 23 pages, San Diego, California.

*Primary Examiner*—Thai-Ba Trieu
(74) *Attorney, Agent, or Firm*—Reinhart Boerner Van Deuren P.C.

(57) ABSTRACT

The invention combines the features of a supercharger, a turbocharger and turbo-compounding into one system, utilizing a hydraulic or mechanical continuously variable transmission to drive the turbocharger up to a specific speed or intake manifold pressure and then holding the ideal speed to keep it at the right boost pressure for the engine condition. The benefits of a supercharger, which is primarily good for high torque at low speed, and a turbocharger, which is usually only good for high horsepower at high speeds are merged. Once the exhaust energy begins to provide more work than it takes to drive the intake compressor, the invention recovers that excess energy and uses it to add torque to the crankshaft. As a result, the invention provides the benefits of low speed with high torque and the added value of high speed with higher horsepower or better fuel economy all from one system.

3 Claims, 7 Drawing Sheets

U.S. PATENT DOCUMENTS

| | | | | |
|---|---|---|---|---|
| 2,485,126 | A | * | 10/1949 | Wood .......................... 475/76 |
| 2,769,303 | A | * | 11/1956 | Lucia et al. .................. 60/608 |
| 2,774,342 | A | * | 12/1956 | Schilling .................... 123/561 |
| 2,779,212 | A | * | 1/1957 | Fell ............................... 475/8 |
| 2,830,472 | A | * | 4/1958 | Brass ......................... 475/297 |
| 2,929,198 | A | * | 3/1960 | Crocchi ....................... 60/608 |
| 3,298,250 | A | * | 1/1967 | Moss et al. ..................... 475/8 |
| 3,307,426 | A | * | 3/1967 | Whitaker ....................... 475/2 |
| 3,391,753 | A | * | 7/1968 | Anderson .................... 180/307 |
| 3,924,490 | A | * | 12/1975 | Mills ........................... 475/76 |
| 4,083,188 | A | | 4/1978 | Kumm ......................... 60/608 |
| 4,312,183 | A | | 1/1982 | Regar .......................... 60/608 |
| 4,605,358 | A | * | 8/1986 | Burandt ....................... 417/236 |
| 4,729,225 | A | * | 3/1988 | Bucher ........................ 60/608 |
| 4,803,969 | A | | 2/1989 | Hiereth et al. ................ 60/608 |
| 4,813,306 | A | * | 3/1989 | Kita et al. ..................... 475/80 |
| 4,956,973 | A | * | 9/1990 | Fortnagel et al. .............. 60/611 |
| 5,033,269 | A | * | 7/1991 | Smith .......................... 60/607 |
| 5,113,658 | A | | 5/1992 | Kobayashi .................. 60/608 |
| 5,125,806 | A | * | 6/1992 | Quick et al. ............. 417/423.6 |
| 5,138,840 | A | * | 8/1992 | Oguchi et al. ................. 60/624 |
| 5,309,778 | A | * | 5/1994 | Antonov .................... 74/15.86 |
| 5,555,730 | A | * | 9/1996 | Hope .......................... 60/606 |
| 5,713,204 | A | | 2/1998 | Kadlicko ..................... 60/608 |
| 5,729,978 | A | | 3/1998 | Hiereth et al. ................ 60/607 |
| 5,890,468 | A | * | 4/1999 | Ozawa ....................... 123/561 |
| 6,273,076 | B1 | | 8/2001 | Beck et al. |
| 6,343,473 | B1 | | 2/2002 | Kanesaka .................... 60/609 |
| 6,435,999 | B1 | * | 8/2002 | Nanri et al. .................. 475/76 |
| 6,447,422 | B1 | * | 9/2002 | Haka .......................... 475/211 |
| 6,537,169 | B1 | * | 3/2003 | Morii ............................ 475/8 |
| 6,623,247 | B2 | * | 9/2003 | Du ................................ 417/53 |
| 6,675,579 | B1 | * | 1/2004 | Yang ........................... 60/611 |
| 6,681,574 | B2 | * | 1/2004 | Berglund et al. ............. 60/609 |
| 6,755,093 | B2 | * | 6/2004 | Bennett et al. ................ 74/438 |
| 7,055,507 | B2 | * | 6/2006 | Kelley, Jr. ................. 123/559.1 |
| 2005/0211231 | A1 | * | 9/2005 | Kelley, Jr. ................. 123/559.1 |

FOREIGN PATENT DOCUMENTS

JP          08303251 A    *    11/1996

* cited by examiner

SUPER-TURBOCHARGER

CROSS-REFERENCE TO RELATED PATENT APPLICATIONS

This patent application claims the benefit of U.S. Provisional Patent Application No. 60/601,844, filed Aug. 16, 2004.

FIELD OF THE INVENTION

This invention pertains to turbochargers, and more particularly to hydraulically driven turbochargers.

BACKGROUND OF THE INVENTION

Conventional turbochargers are driven by waste exhaust heat and gases, which are forced through an exhaust turbine housing onto a turbine wheel. The turbine wheel is connected by a common turbo-shaft to a compressor wheel. As the exhaust gases hit the turbine wheel, both wheels rotate simultaneously. Rotation of the compressor wheel draws air in through a compressor housing, which forces compressed air into the engine cylinder to achieve improved engine performance and fuel efficiency. Turbochargers for variable speed/load applications are typically sized for maximum efficiency at torque peak speed in order to develop sufficient boost to reach peak torque. However, at lower speeds, the turbocharger produces inadequate boost for proper engine transient response. Conversely, the turbocharger produces too much boost at rated speed and load. As a result, a wastegate is often used, which allows the use of a smaller turbocharger to reduce lag while preventing it from spinning too quickly at high engine speeds.

The wastegate is a valve that allows the exhaust to bypass the turbine blades. The wastegate is used to control the boost pressure. If the pressure gets too high, it could be an indicator that the turbine is spinning too quickly, so the wastegate bypasses some of the exhaust around the turbine blades, allowing the blades to slow down. This wasted energy reduces overall engine efficiency but prevents damage to the turbocharger from over-speed and prevents damage to the engine from over boosting.

Industry has recognized the wasted energy and has made attempts to harness the wasted energy. For example, U.S. Pat. No. 6,553,764 discloses a turbocharger system that mechanically couples a first motor/generator to the turbo-shaft of the turbocharger system wherein the first motor/generator is coupled to a second motor/generator that is coupled to a flywheel. During periods of excess turbocharger boost, the turbo-shaft drives the first motor/generator as a generator to provide power to drive the second motor/generator as a motor and store energy in the flywheel. During periods of insufficient boost, the energy stored in the flywheel is used to drive the second motor/generator as a generator to drive the first motor/generator as a motor, which drives the turbo-shaft, to accelerate the turbo-shaft more quickly. While this system is more efficient than conventional systems, the use of a flywheel creates additional problems. These problems include the flywheel failing destructively and damaging other components as it breaks apart into shrapnel-sized pieces, added weight to contain the flywheel, decreased stability during turns, increased control complexity to counter the forces generated by the flywheel, etc.

Another approach is illustrated in U.S. Pat. No. 5,113,658 that operates during periods of insufficient boost uses a hydraulic assist turbine mounted on the turbo-shaft between the compressor and turbine. During operation when the turbocharger does not provide sufficient boost, pressurized hydraulic fluid is supplied as high energy jets to the hydraulic assist turbine for rotating the hydraulic assist turbine, which in turn, drives the turbo-shaft. At periods of sufficient boost and excess boost, pressurized hydraulic fluid is not supplied to the hydraulic assist turbine. While this approach is more efficient than conventional turbocharger systems, this approach does not solve the problem of harnessing the wasted energy during periods of excess boost.

Another approach is illustrated in U.S. Pat. No. 6,343,473. In this approach, a supercharger is put in series with a turbocharger. During operation when the turbocharger does not provide sufficient boost, the supercharger is used to provide compressed air to the turbocharger compressor. At operational points where there would normally be excessive boost, the amount of air provided to pressurize the inlet is reduced by diverting the air flow, thereby reducing the amount of compressed air fed to the turbocharger compressor inlet. The problem with this approach is that the turbocharger is undersized and smaller than normal due to the supercharger providing compressed air to the turbocharger compressor. Should the supercharger fail since it is in series with the turbocharger, the turbocharger on its own is insufficient to provide the low speed torque required for starting and accelerating performance.

A further approach is illustrated in U.S. Pat. No. 5,729,978. In this approach, a turbocharger is used with a mechanical step-up transmission connected to the turbo-shaft to increase the torque during low speed operation. The step-up transmission includes a step-up gear (i.e., a two-stage change-speed gearbox) and a controllable hydrostatic coupling. To achieve shorter response times during transient operation, the hydrostatic coupling is locked up by a mechanical or electro mechanical clutch. The system decouples the exhaust gas turbine from the compressor at low rotational speeds so that the mechanical gearbox only has to drive the compressor. At higher speeds, the turbine is accelerated by exhaust gas flow and at a specified speed, it is coupled onto the turbocharger shaft by the clutch. The problems introduced with this system include the use of further components such as the step-up gear and the hydrostatic coupling, which reduces overall reliability. In the event that the hydrostatic coupling fails, the turbocharger operation may fail.

What is still needed is a system the increases efficiency that does not have the above-mentioned problems. The invention provides such a system. These and other advantages of the invention, as well as additional inventive features, will be apparent from the description of the invention provided herein.

BRIEF SUMMARY OF THE INVENTION

The invention combines the features of a supercharger and a turbocharger utilizing a hydraulic pump to drive the turbocharger up to a specific speed or intake manifold pressure and then hold back the turbocharger to keep it at the right speed for the engine condition. The invention merges the benefits of a supercharger, which is primarily good for high torque at low speed, and a turbocharger, which is usually only good for high horsepower at high speeds. Once the exhaust energy begins to provide more work than it takes to drive the intake compressor, the invention recovers that excess energy and puts it to work turning the crankshaft. As a result, the invention provides both the benefits of low speed with high torque and the added value of high speed with high horsepower all from one system. The power available from an engine system with a super-turbocharger is greater than that of a turbocharged engine due to the elimination of the wastegate, the larger overall size of the turbocharger, vanes that make the compressor and turbine more efficient, and the ability of the system to hold the turbocharger at an optimum speed.

The invention provides a power take-off mechanism on the turbo-shaft of a turbocharger. The power take-off mechanism is connected to a variable speed transmission. The transmission can be in the form of a hydraulic motor/pump that is hydraulically connected to a variable displacement motor/pump such as a swashplate pump that is operatively connected to the crankshaft of the engine or it can be a mechanical continuously variable transmission like that used in some automobiles.

During engine operating conditions in which the turbocharger produces more energy than required for operation, the mechanism diverts the excess energy and drives the transmission, which in turn drives the crankshaft with more torque.

During engine operating conditions in which the turbocharger is incapable of meeting the boost demands of the engine (such as low speed high torque operation), the variable ratio transmission is driven, which results in the acceleration of the mechanism being driven, thereby increasing the speed of the turbo-shaft. As a result, the turbocharger delivers more pressure and airflow to the intake manifold of the engine to meet the boost demands.

The power take-off mechanism is in the form of a gear train such as a planetary gear system with a reduction gear or a speed-summing differential. The planetary gear system has three planetary gears within a stationary gear connected to the turbo-shaft. The three planetary gears rotate around outer ring gear as the gear connected to the turbo-shaft rotates with the turbo-shaft. Attached to the three planetary gears is an output gear with its gear diameter slightly larger than the super-turbocharger shaft. The output gear of the planetary gear set is in a gear mesh relation with to two equal size idler gears on either side of the gear attached to the three planetary gears. The two idler gears are connected to a reduction gear that takes the output of the two idler gears and feeds that to the hydraulic pump/motor. The speed-summing differential is used for very large engines where a purely hydraulic system could not handle the power requirements. The differential is connected to the hydraulic pump/motor. In a preferred embodiment, the hydraulic pump/motor is a variable displacement hydraulic pump/motor such as a swashplate pump that can also function as hydraulic motors depending on the angle of the swashplate.

Other aspects, objectives and advantages of the invention will become more apparent from the following detailed description when taken in conjunction with the accompanying drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Turbocompounding is a way to harness excess exhaust energy that is not used by the turbine of the turbocharger. This is achieved by adding a second larger turbine attached to a transmission which is then attached to the output shaft of the engine. Turbocompounding can improve fuel economy by as much as 5%. This invention provide the best of both turbocompounding and supercharging all in one device. The invention provides a system that reduces turbocharger lag and harnesses excess exhaust energy from the turbocharger. The invention utilizes relatively inexpensive and commercially available components. The overall system cost of the system in accordance with the invention is believed to be equal to or less then that of a supercharger system and only slightly more expensive than a turbocharger system.

The invention combines the features of a supercharger and a turbocharger, utilizing a hydraulic pump to drive the turbocharger up to a specific speed or intake manifold pressure and then hold back the turbocharger to keep it at the right speed for the engine condition. Once the exhaust energy provides more work than it takes to drive the intake compressor the invention recovers that excess energy and puts it to work turning the crankshaft. As a result, the invention provides both the benefits of low speed with high torque and the added value of high speed with high horsepower all from one system. The invention merges the benefits of a supercharger, which is primarily good for high torque at low speed, and a turbocharger, which is usually only good for high horsepower at high speeds. Neither one are good at both at the same time.

Figure 1:
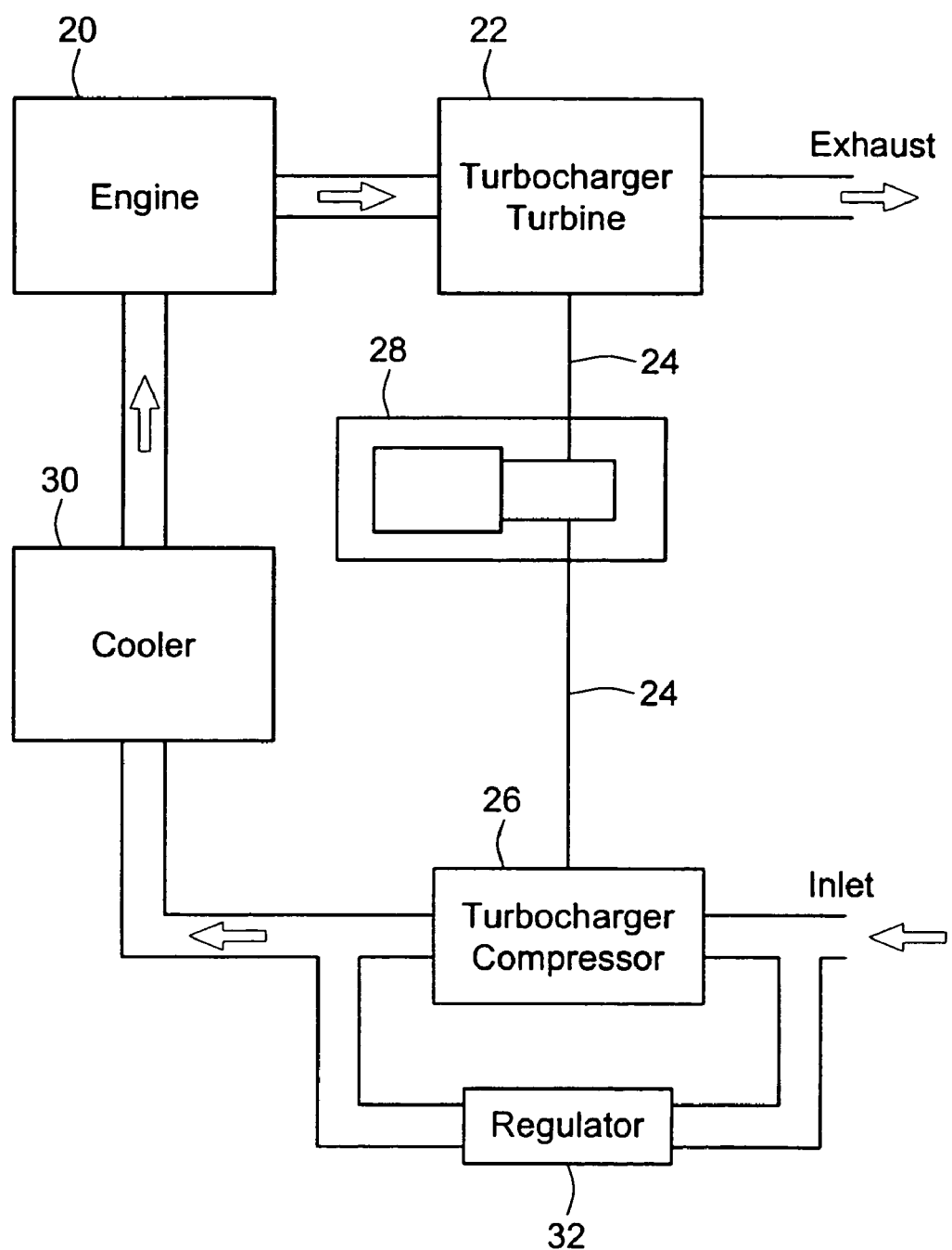
FIG. 1 is a block diagram of the main components of a super-turbocharger in accordance with the invention.

Turning to the drawings, wherein like reference numerals refer to like elements, the invention is illustrated as being implemented in a suitable environment. With respect to FIG. 1, the exhaust gas from engine 20 travels through the turbocharger turbine 22 causing the turbine 22 to spin turbo-shaft 24. The rotation of turbo-shaft 24 rotates turbocharger compressor 26 and planetary gear train 28. The compressor 26 compresses inlet air, which is fed through optional cooler 30 and into the engine cylinders (not shown). The optional cooler 30 is an air cooler that cools compressed air after the compressor 26 to deliver cooler air to the engine. The planetary gear train 28 as discussed below is used to both drive the turbo-shaft 24 during low engine load operation and remove excess energy during high engine load operation. The wastegate that is part of traditional turbochargers is no longer needed on the exhaust side of the turbocharger. As will be explained below, a boost pressure control valve 32 is required on the intake side of the turbocharger to regulate pressure so that the intake system does not get too high for the engine to handle. In the description that follows, the term super-turbocharger refers to the turbocharger (turbine 22, turbo-shaft 24, and compressor 26) and gear train 28.

Figure 2:
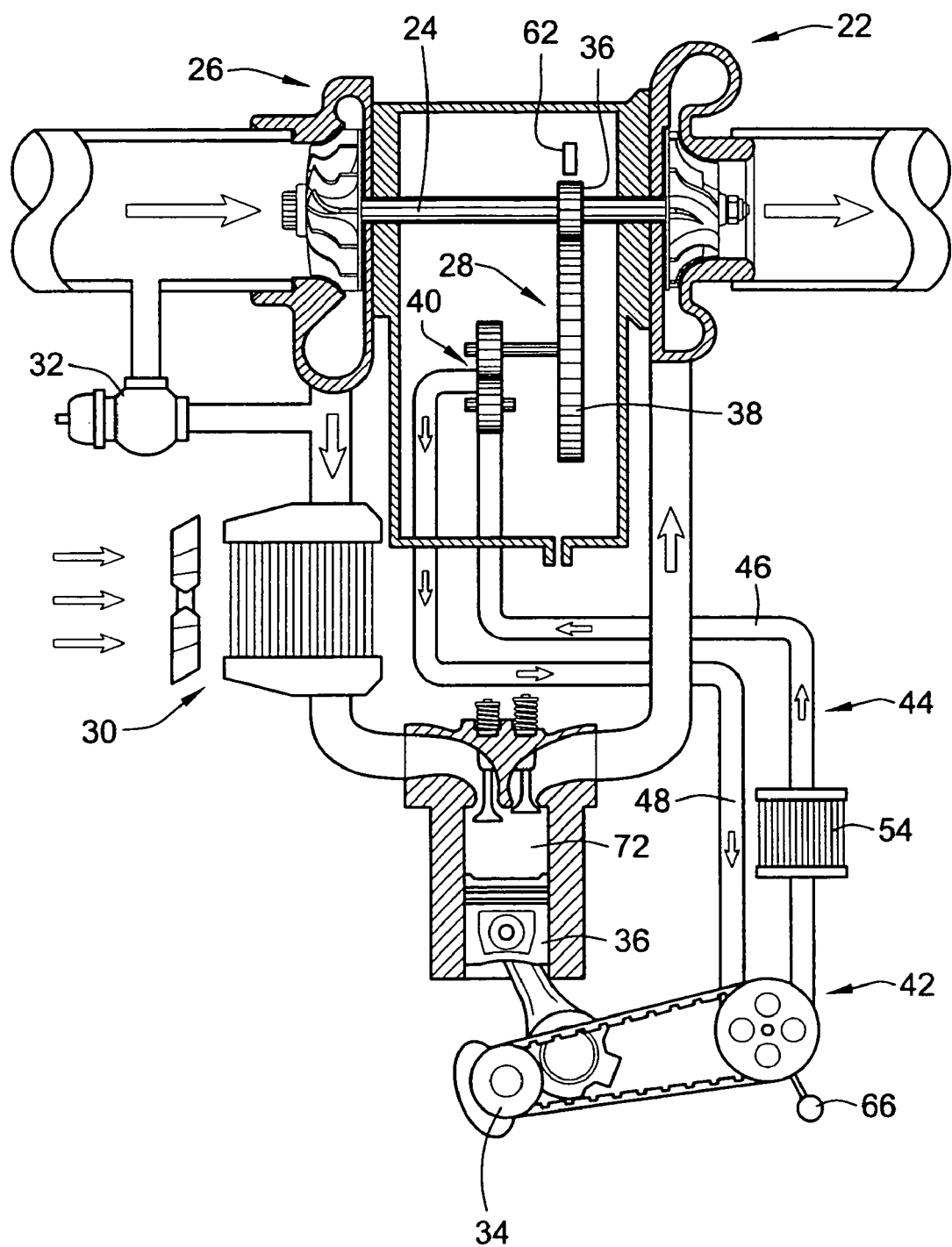
FIG. 2 is a schematic representation of the super-turbocharger of FIG. 1.
Figure 3:
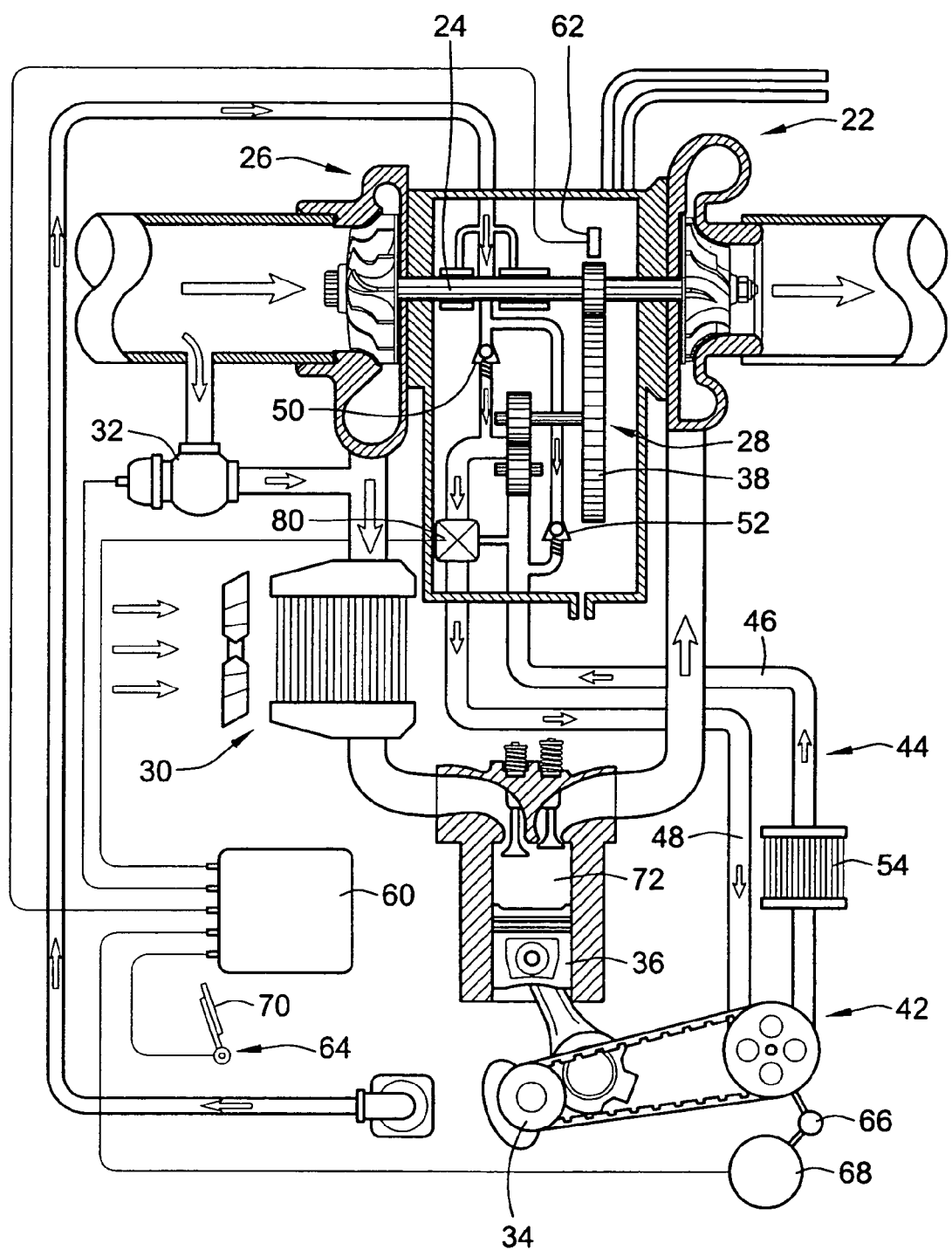
FIG. 3 is a more detailed schematic representation of the super-turbocharger of FIG. 2.

Turning now to FIGS. 2 and 3, the invention is shown in more detail. One of the key features of the invention is that the driving power that is provided from the crankshaft 34 needs to be delivered in a variable speed between the crankshaft of the engine and the super-turbocharger. Once the connection is made between the crankshaft 34 and the super-turbocharger it is possible to put energy into the super-turbocharger to spin it up to an appropriate speed level. Once the turbocharger has generated excess energy on the turbine side 22 to overcome the power required to perform the task of compressing the air on the compressor side 26, additional energy is delivered back from the super-turbocharger to the crankshaft 34. This recovered energy generates excess power that would normally be wasted by the exhaust wastegate in a typical turbocharger. The energy recovered to the crankshaft can improve fuel economy and the peak horsepower of the engine system. It combines the excess energy from the turbine as well as the energy from the pistons 36, and delivers all of that to the transmission.

The super-turbocharger removes power from and adds power to the turbo-shaft 24 via the planetary gear reduction 28 through a speed reduction mechanism comprising planetary gears 36, 38 feeding a hydraulic gear motor/pump 40. The gear motor 40 is fed from a swashplate pump 42 attached to the crankshaft 34. The swashplate pump 42 has a variable flow output based on the angle of the swashplate. Hydraulic energy would be put into the super-turbocharger at low speed via hydraulic circuit 44, the motor/pump 40 and planetary gears 36, 38 and gear reduction 28. The hydraulic circuit 44 includes hydraulic lines 46, 48. The hydraulic motor/pump 40 turns into a hydraulic pump at high speed and pushes the swashplate pump 42 at high speeds thereby returning energy back to the crankshaft 34 in the same closed hydraulic circuit.

The hydraulic circuit 44 is fed by engine oil pressure through check valves 50, 52 into each side of the system so that the hydraulic lines 46, 48 in the closed loop system will always maintain a positive pressure, at least as high as in the oil pressure lines within the engine. This approach provides a replenishment of hydraulic fluid based on the fact that there will be some leakage in the shaft between the hydraulic motor 40 and the gear reduction 28 within the super-turbocharger, as well some potential leakage of the hydraulic pressure within the swashplate pump 42. Note that the super-turbocharger may require an oil cooler 54 to prevent over heating of the engine oil that is used for hydraulic oil. The engine oil may also be used for lubrication within the super-turbocharger housing since it is already present. Alternatively, a separate hydraulic system can be used.

As previously indicated, the wastegate that is normally associated with turbochargers is no longer on the exhaust side of the turbocharger system. However, a boost pressure control valve (i.e., regulator 32) is required on the intake side of the super-turbocharger in parallel with the turbocharger compressor 26. The reason for this is that the hydraulic system prevents the super-turbocharger from overspeeding or going too fast (i.e., from going above an upper speed limit) from too much exhaust energy. To accomplish this, the intake requires pressure regulation so that the intake system does not reach a pressure that is too high for the engine. The regulator 32 will open and at that point the excess energy from the turbine 22 will pressurize the pump 40 within the super-turbocharger. The pump 40 will feed the excess energy back to the swashplate pump 42, now being driven as a motor. The swashplate pump, in turn, drives the crankshaft 34 of the engine, thereby creating additional horsepower that would normally be wasted by dumping exhaust gas through a wastegate.

Note that the planetary gear reduction 28 provides one of the best methods of taking power off of the turbo-shaft 24 that spins at very high speed, typically on the order of between 50,000 and 100,000 rpm. The planetary gear reduction 28 has two or more gears around the shaft provide a high ratio gear reduction from the high-speed shaft. The typical three gears that rotate around the turbo-shaft 24 provide an even power take-off in three directions where the directional vectors of the three gears cancel each other out and provide no directional force to push the turbo-shaft 24 off center within its bearings. As a result, the design eliminates any power take-off vector that would have an adverse affect on the position of the high-speed shaft within the bearings of the super-turbocharger. The planetary gear reduction feeds a secondary gear reduction that feeds the hydraulic pump. This whole mechanism is designed to be within the length of a typical turbocharger bearing housing because it is undesirable that a turbocharger shaft be extended much longer in length than they already are due to their high rpm. The planetary configuration of gear reduction also improves the reliability of the power input and power take-off of the super-turbocharger system.

The design of the super-turbocharger of the invention is different from a conventional turbocharger. There are two major differences that increase the energy potential to be returned to the crankshaft 34. The first difference is that there are permanent vanes on both the compressor and turbine side of the housings. Vanes on the intake side normally raise the peak efficiency at the expense of narrowing the speed range of the compressor in conventional turbochargers, which significantly limits the operational scenarios where the vanes could be used with conventional turbochargers. Permanent vanes on the exhaust side normally raise the peak pressure too high and over-speed the turbine in conventional turbochargers. However, the present invention controls the rotational speed of the super-turbocharger. As a result, vanes on both the intake side and exhaust side can be used and the invention makes use of this greater amount of available power.

The second difference is that slower speed, larger sized exhaust turbines can be used. Traditionally, higher speed, smaller sized turbochargers are used to reduce turbo lag. A slower speed, larger size turbine can be used because turbo lag will not be a problem due to the hydraulic boost spooling the super-turbocharger up to speed. The use of a larger turbine provides additional peak boost potential and additional energy recovery once boost is limited on the intake side.

Now that the overall system has been described, the control of the system shall be described. In the description that follows, a separate controller shall be used. It is recognized by those skilled in the art that the controller may also be part of another controller such as the engine management system. The use of a separate electronic device allows the system to be provided as an add-on system to any vehicle where the owner desires more horsepower potential than is available from either a supercharger or turbocharger.

The controller 60 requires a speed sensor 62 on the super-turbocharger at some point in the gear reduction system 28 for controlling the speed of the super-turbocharger. With knowledge of the ideal and optimum speed of the super-turbocharger, the controller 60 uses the speed at either the highest efficiency or highest boost pressure rpm of the turbocharger as the control point for the turbocharger speed. The controller 60 also controls regulator 32 to have electronic boost control over the intake side. The other input the controller 60 uses is the throttle position 64 to determine power delivery requests of the driver. With throttle position 64, the speed of the super-turbocharger can be controlled to be at its optimum speed all the time while being sensitive to the power delivery requests of the driver.

The controller 60 controls the lever 66 on the swashplate pump 42 via motor or actuator 68 to control the angle of the swashplate. The angle of the swashplate varies the speed of the super-turbocharger during various modes of operation. When the engine is at idle speed, the controller 60 adjusts the control level to be at the minimum amount of angle for the swashplate. In one embodiment, the swashplate pump 42 will spin the super-turbocharger to some specific rpm well below the point where it creates any significant intake boost pressure when the control level is set to the minimum amount or angle. For example, with the engine running at idle of say 1,000 rpm, the super-turbocharger would be running at its idle speed of approximately 5,000 rpm.

Once the throttle 70 (represented in the figure as a throttle pedal) is depressed signifying that the driver requires more power, the super-turbocharger is sped up by the changing the angle of the swashplate pump 42 via motor 68. Changing the angle of the swashplate pump 42 from its minimum angle increases the hydraulic pressure to the gear motor 40, thereby increasing the speed of the turbo-shaft 24. Pumping a significant hydraulic pressure to the gear motor 40 will rapidly accelerate the super-turbocharger up into the speed range where it produces significant pressure in the intake channel (i.e., through compressor 26) making more power from the greater charge density in the cylinders 72.

In one embodiment, the swashplate pump lever 66 is moved all the way in the maximum position until the point where the super-turbocharger reaches its optimum speed. At the maximum position, the hydraulic circuit 44 is at its highest pressure level, which causes hydraulic pump 40 to rotate faster, thereby accelerating the turbo-shaft 24 at a faster rate. Once the optimum speed is reached, the controller 60 commands the swashplate pump lever 66 to be pulled back to an interim position where the speed of the super-turbocharger is maintained at its optimum speed. As the engine continues to increase power output and produce more exhaust heat at higher speeds, the controller 60 commands the intake regulator 32 to open, thereby maintaining the appropriate level of pressure in the intake system.

The unused compressor energy requires the hydraulic system 44 to hold back the excess energy from the turbine 22 to maintain speed. The turbine 22 will keep putting additional energy into the hydraulic system 44 via planetary gear train 28 and hydraulic pump 40 and "push" the energy down to the swashplate pump 42 and on to the crankshaft 34. As the crankshaft speed increases, the swashplate pump 42 is controlled to maintain the speed of the super-turbocharger at the desired level.

In one embodiment, a hydraulic brake 80 is added to the system. The controller 60 controls the hydraulic brake 80 to prevent the over speeding of the engine by preventing the turbine 22 from putting excess energy from the exhaust back to the crankshaft 34 as described above. The excess energy could over-speed the crankshaft 34 when there is no load such as a shift between gears, or there is no load because of a decelerating condition such as the clutch of the engine being disengaged. With permanent vanes in the turbine housing as previously described, under deceleration there may be far too much energy generated from the turbine blades. The addition of a hydraulic brake provides the capability to better control the excess energy from the exhaust heat whenever the driver removes his foot from the throttle. While other techniques can be used, the hydraulic brake allows a deceleration condition to be managed without another device. This brake will also insure that there is some level of engine braking effect during deceleration conditions.

In a further embodiment, an intercooler 30 is used. The use of an intercooler 30 provides a major advantage for the system as a compressor increases the heat in the intake system and increases the chances of detonation from hot and high-pressure intake manifold air. The intercooler 30 can be an air-to-air intercooler. Alternatively, the intercooler 30 can be an air-to-water intercooler where a water radiator is used and the cooling water is used in the intercooler 30 to cool the intake charge in a similar way as the air-to-air intercooler. The benefit of a water-based intercooler is there is a shorter path than air-to-air intercoolers as they are smaller then air-to-air intercoolers. Therefore, there is a shorter path between the compressor 26 and the cylinder 72. The other added benefit of a water-cooled intercooler is its ability to be used as a heater by being able to divert the cool water away from the intercooler and put hot engine water into the intercooler as an alternative. The ability to variably control the charge cooling temperature provides a better control of a homogeneous charge compression ignition engine.

Figure 4:
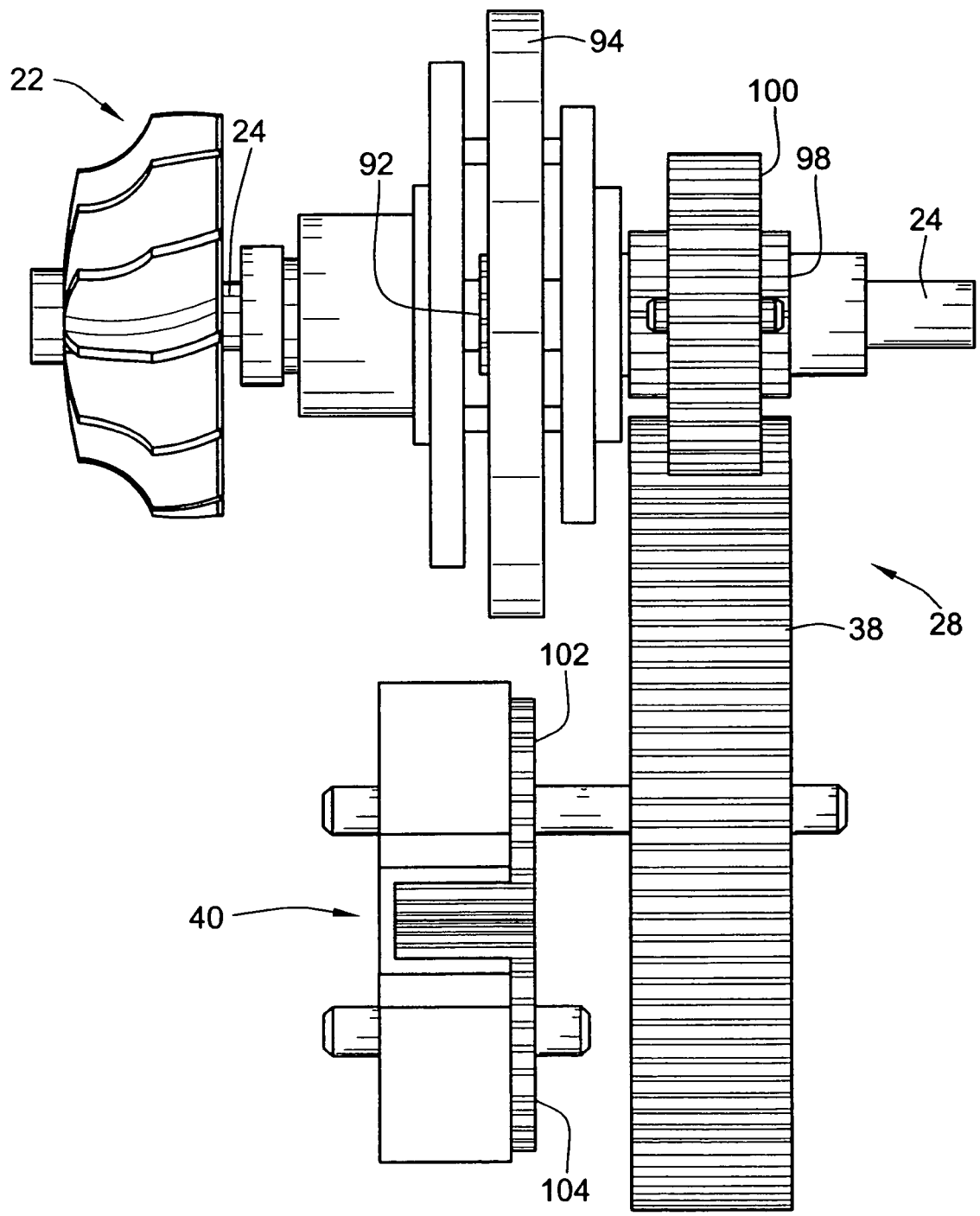
FIG. 4 is a cross-sectional view of a gear train of the super-turbocharger of FIG. 1.
Figure 5:
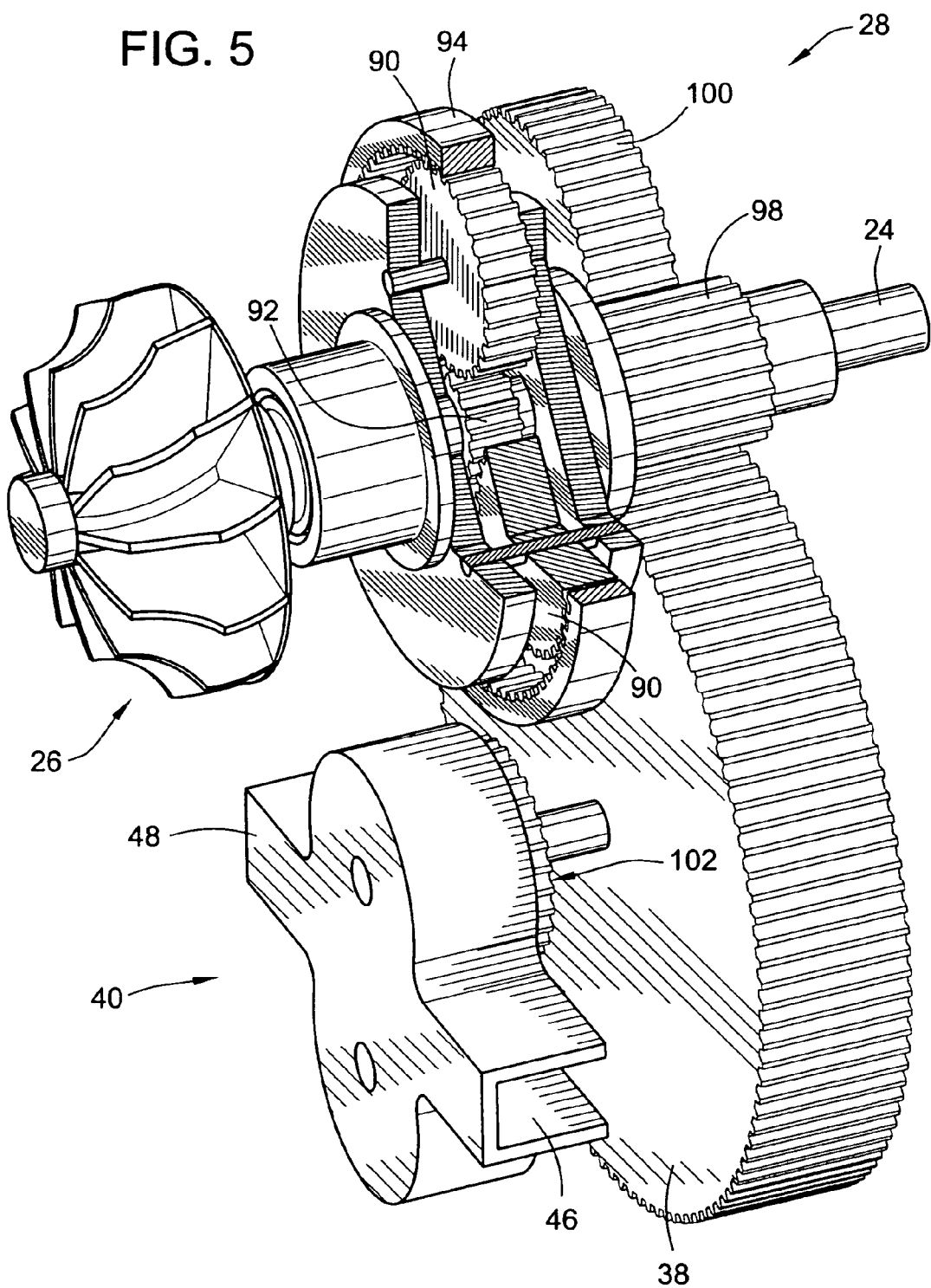
FIG. 5 is a partial isometric view of the gear train of FIG. 4.
Figure 6:
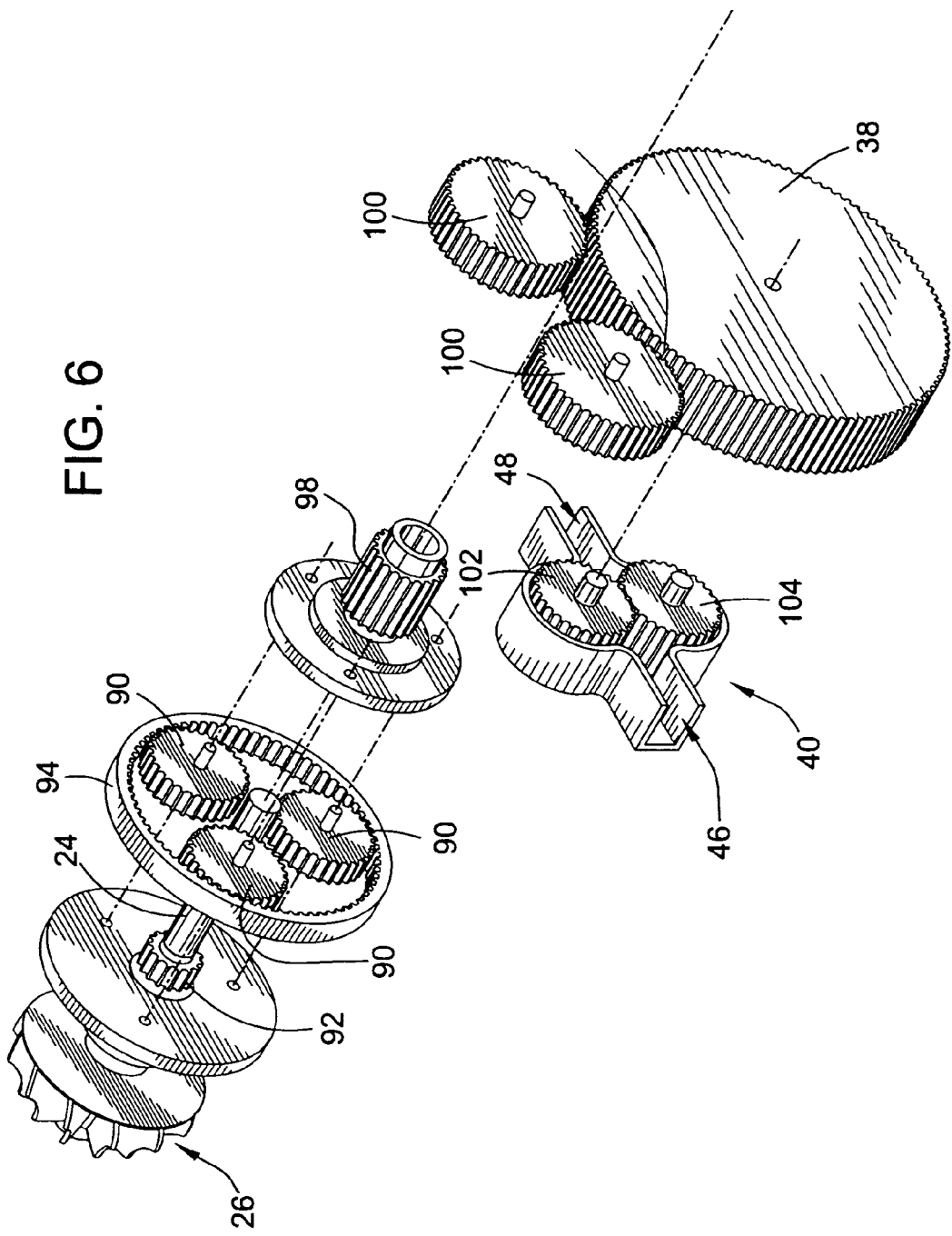
FIG. 6 is an exploded isometric view of the gear train of FIG. 4.

Turning now to FIGS. 4-6, in one embodiment, the planetary gear speed reduction power take-off 28 from the turbo-shaft 24 has three planetary gears 90 within a stationary gear 92 connected to the turbo-shaft 24. The three planetary gears 90 rotate around outer ring gear 94 as gear 92 rotates with the turbo-shaft 24. The outer ring gear 94 is connected to the housing. Attached to the three planetary gears 90 is an output gear 98 with its gear diameter slightly larger than the super-turbocharger shaft 94. The output gear 98 of the planetary gear set is in gear mesh relation to two equal size idler gears 100 on either side of the gear 98 attached to the three planetary gears. The two idler gears 100 are connected to the large output gear 38 that takes the output of the two idler gears 100 and feeds that to the hydraulic drive motor 40. The combination of the rotating planetary three-gear set attached to the output gear 98 to the two idler gears 100 insures that all forces are balanced in each direction. As a result, any driving force on the super-turbocharger shaft 24 should be equalized. It is critical to long term reliability that there be no up or down or side-to-side force that would push the high-speed turbocharger shaft 24 out of alignment with its bearings.

The hydraulic drive motor 40 would just be two more gears 102, 104 with gear 102 attached to the main speed reduction gear 38. The gears 102, 104 are sized appropriately for the correct flow of hydraulic fluid. The hydraulic drive motor 40 is designed to match the ideal turbine speed and the hydraulic power required from the swashplate pump 42 and is also designed such that the pressure in the hydraulic system should not exceed design level.

During operation when there is insufficient boost to spin the turbine 22 and compressor 26, the hydraulic circuit 44 flows through hydraulic pump 40 and causes gears 102 and 104 to rotate. The rotation of gear 102 rotates reduction gear 38, which in turn rotates idler gears 100. The rotation of idler gears 100 rotates output gear 98, which in turn rotates the three planetary gears 90. The rotation of the planetary gears 90 results in the rotation of gear 92, thereby rotating turbo-shaft 24 (and the turbine 22 and compressor 26). During periods of excessive boost, the drive pressure reverses direction where rotation of turbo-shaft 24 rotates gear 92, which rotates planetary gears 92 and output gear 98, which in turn rotates idler gears 100, which in turn rotates reduction gear 38, which in turn rotates hydraulic pump 40. The rotational direction of all the components stays the same.

Figure 7:
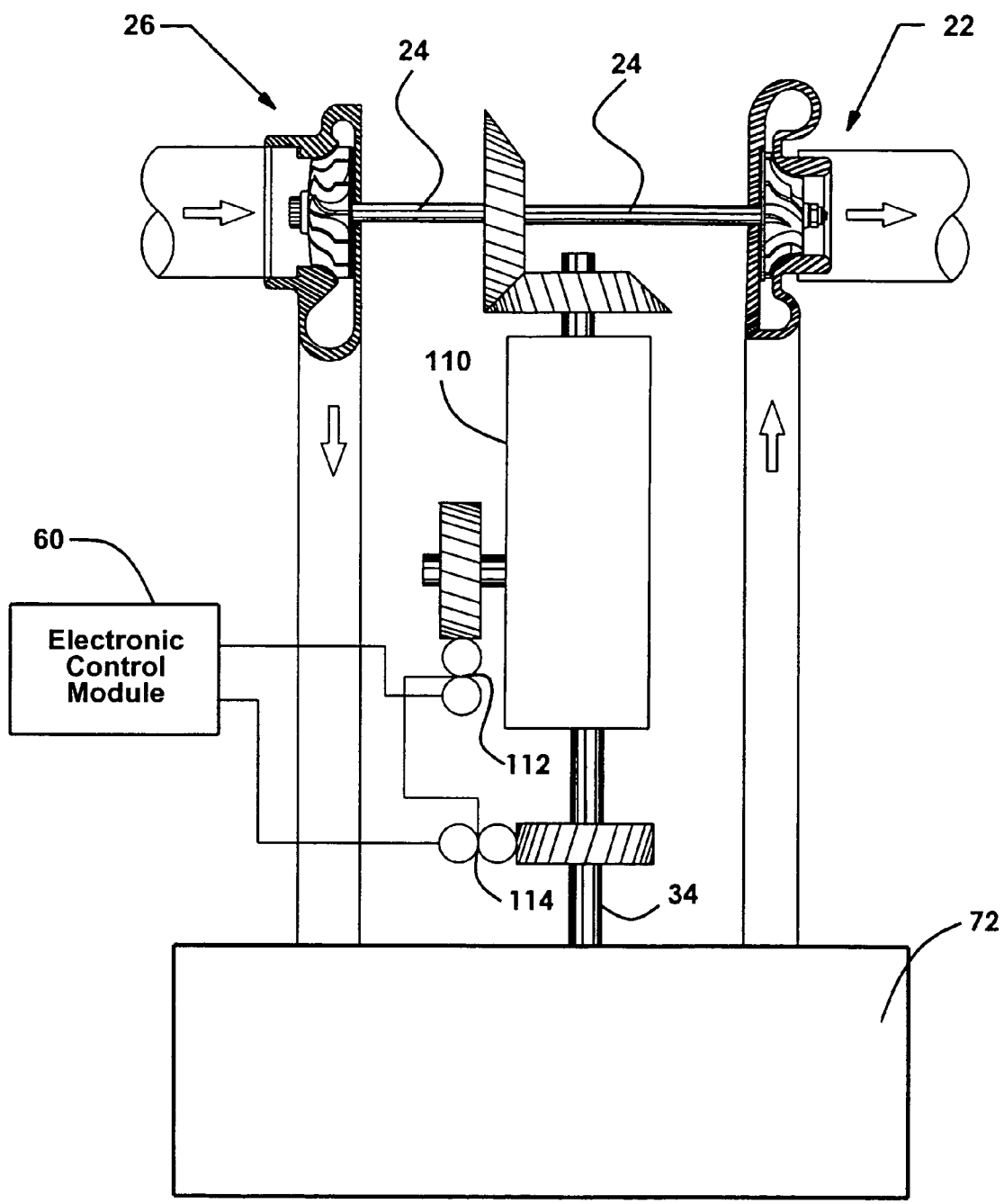
FIG. 7 is a block diagram of a gear train of the super-turbocharger of FIG. 1 for very large engines or engine systems where higher power transmission efficiency matters.

It is noted that on very large engines the cost and size of the turbocharger system and the efficiency required of the power delivery may be more significant than a purely hydraulic system can manage. The invention uses a speed-summing differential between the turbocharger and the engine for these very large engines. Turning now to FIG. 7, the invention replaces the hydraulic transmision with a speed-summing differential 110. A variable displacement hydraulic pump 114 that is driven by the engine acts on the hydraulic motor 112 as an external hydraulic source in either direction such that the variable displacement pump 114 controls the speed and direction of motor 112 to vary the relative speed between the engine and the turbo-shaft. Note that variable displacement pump 114 is operably connected to crankshaft 34. In a preferred embodiment, the variable displacement pump 114 is a swashplate pump that can put out hydraulic pressure in either direction (e.g., variable displacement pump 114 may be swashplate pump 42).

In the description that follows, the term super-turbocharger refers to the turbocharger (turbine 22, turbo-shaft 24, and compressor 26) and the internal gear reduction. The speed-summing differential 110 requires the variable displacement pump 114 to control the speed and direction of hydraulic motor 112. During operation, the controller 60 senses engine speed and load, turbo-shaft speed, and the super-turbocharger boost pressure. Based on these factors, the controller 60 manages the flow of power into and out of the speed-summing differential 110 by controlling the variable displacement hydraulic pump 114 by adjusting its swashplate displacement.

During operating conditions in which the turbine side of the super-turbocharger produces more energy than required for boost, the speed-summing differential 110 diverts the excess energy to the crankshaft of the engine 72 by direct mechanical connection. The proper turbo-shaft 24 speed is maintained by the controller 60 by adjusting the hydraulic flow of the variable displacement motor/pump 114 to drive pump/motor 112 at a speed that sets the speed-summing differential to the correct ratio. As a result, the crankshaft 34 rotates with more torque and the engine drive train absorbs the excess power, thereby reducing fuel demand.

During operating modes where the compressor portion of the super-turbocharger is incapable of meeting the boost demands of the engine (e.g., at low speeds), the controller 60 adjusts the swashplate angle of pump 114 such that the crankshaft drives variable displacement motor/pump 114 as a pump. The motor/pump 112 operates as a motor and drives the speed-summing differential 110, changing the gear ratio between the crankshaft and the turbo shaft, which drives turbo-shaft 24 to rotate faster than it would have been driven by the exhaust gas turbine alone. As a result, the super-turbocharger delivers sufficient air to the intake manifold to increase the boost to the engine.

As can be seen from the foregoing, a super-turbocharger has been presented that is economical to make and that overcomes the problems in the art. The gear train of the invention (planetary gear train 28 and speed-summing differential 110) can operate at high temperatures and high speeds. The gear train is balanced such that it does not push the turbo-shaft off of its center of spin when power is applied or removed from the turbo-shaft. The high mechanical efficiency of the gear trains and hydraulic energy conversion increases efficiency of the system. Additionally, the sizing of the compressor and turbine can be decoupled since the invention provides flexibility in either consuming (and utilizing) excess turbine energy or creating additional compression energy otherwise not available from the exhaust gas driving the turbine. Furthermore, more exhaust energy is extracted from the turbocharger, which lowers exhaust temperatures and reduces EGR cooling load in low-pressure EGR systems. The added performance provided by the invention may eliminate the need for variable geometry turbochargers or series turbochargers presently used on truck engines.

One of the main benefits to the system described above is that the swashplate pump 42, hydraulic gear motor 40, and variable displacement pumps 112, 114 are relatively inexpensive and are commercially readily available in the market place and are combined with the inherent lower cost of a turbocharger compared to a supercharger. The overall system cost of the invention should be equal or less then that of a supercharger system and only slightly more expensive than a turbocharger system. It is estimated that the invention provides a five to seven percent increase in fuel efficiency and a five to ten percent increase in peak power when compared to a conventional turbocharged engine system.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A super-turbocharger system, comprising:
a turbocharger having a turbine coupled to a compressor by a turbo-shaft;
a gear train coupled to the turbo-shaft;
a fixed displacement gear motor operatively coupled to the gear train;
a variable displacement pump/motor in fluid communication with the gear motor via a pressurized, closed hydraulic circuit having no sump; and
wherein the variable displacement pump/motor delivers hydraulic power to the fixed displacement gear motor to drive the turbocharger through the gear train in a first mode;
wherein the turbocharger drives the fixed displacement gear motor through the gear train to cause the fixed displacement gear motor to deliver hydraulic power to the variable displacement pump/motor in a second mode;

wherein the gear train comprises planetary gear train having two or more planetary gears in a gear mesh relation to a gear connected to the turbo-shaft and in gear mesh relation to an outer ring gear, the gear train further including an output gear operatively connected to the two or more planetary gears and in a gear mesh relation to two equal size idler gears, the two idler gears in a gear mesh relation to a reduction gear; and wherein the reduction gear is in gear mesh relation with the pump/motor.

2. A super-turbocharger system for use with a piston engine having a crankshaft, comprising:

a turbocharger having a turbine, a compressor, and a turbo-shaft coupling the turbine to the compressor;

a gear train coupling a first end of a variable-speed transmission to the turbo-shaft, a second end of the variable-speed transmission coupled to the crankshaft, the variable-speed transmission comprising a speed-summing differential wherein the output speed of the speed-summing differential is controlled hydraulically using a bi-directional variable displacement pump on the crankshaft that drives a hydraulic motor on a third leg of the speed-summing differential; and a controller for controlling a ratio of the variable-speed transmission, thereby controlling the speed of the turbo-shaft.

3. A super-turbocharger system, comprising:

a turbocharger having a turbine coupled to a compressor by a turbo-shaft;

a gear train coupled to the turbo-shaft;

a fixed displacement gear motor operatively coupled to the gear train;

a variable displacement pump/motor in fluid communication with the gear motor via a pressurized, closed hydraulic circuit having no sump; and wherein the variable displacement pump/motor delivers hydraulic power to the fixed displacement gear motor to drive the turbocharger through the gear train in a first mode;

wherein the turbocharger drives the fixed displacement gear motor through the gear train to cause the fixed displacement gear motor to deliver hydraulic power to the variable displacement pump/motor in a second mode; and at least one check valve configured to supply hydraulic pressure from an external source to the pressurized, closed hydraulic circuit; and wherein the at least one check valve comprises a first check valve coupled to the pressurized, closed hydraulic circuit on an inlet side of the fixed displacement gear motor and a second check valve coupled to the pressurized, closed hydraulic circuit on an outlet side of the fixed displacement gear motor.

* * * * *